United States Patent
McLaughlin et al.

(10) Patent No.: US 12,436,543 B2
(45) Date of Patent: Oct. 7, 2025

(54) PRECISION LANDING SYSTEM

(71) Applicant: Asylon, Inc., Philadelphia, PA (US)

(72) Inventors: Brent McLaughlin, Savage, MD (US); Damon C. Henry, Philadelphia, PA (US); Adam I. Mohamed, Philadelphia, PA (US); Justin Kantor, Morrisville, PA (US); Tal Bass, West Chester, PA (US); Eric Timmons, Medford, MA (US)

(73) Assignee: Asylon, Inc., Philadelphia, PA (US)

( * ) Notice: Subject to any disclaimer, the term of this patent is extended or adjusted under 35 U.S.C. 154(b) by 29 days.

(21) Appl. No.: 18/330,867

(22) Filed: Jun. 7, 2023

(65) Prior Publication Data

US 2024/0176366 A1    May 30, 2024

Related U.S. Application Data

(60) Provisional application No. 63/366,048, filed on Jun. 8, 2022.

(51) Int. Cl.
  G05D 1/654    (2024.01)
  G05D 1/485    (2024.01)
  (Continued)

(52) U.S. Cl.
  CPC ............. G05D 1/654 (2024.01); G05D 1/485 (2024.01); *G05D 2109/20* (2024.01); *G05D 2111/34* (2024.01)

(58) Field of Classification Search
  None
  See application file for complete search history.

(56) References Cited

U.S. PATENT DOCUMENTS 9,158,306 B2   10/2015   Ehlin et al.
10,061,328 B2   8/2018   Canoy et al.
(Continued)

FOREIGN PATENT DOCUMENTS

CN    108802713       11/2018
CN    108802713 A  *  11/2018
(Continued)

OTHER PUBLICATIONS

Merged format of the patent publication CN 108802713 A (Year: 2018).*

(Continued)

*Primary Examiner* — James J Lee
*Assistant Examiner* — Elizabeth Galyn Martinez
(74) *Attorney, Agent, or Firm* — Levine Bagade Han LLP

(57) ABSTRACT

A precision landing system is described for an unmanned aerial vehicle (UAV). The system may include one or more anchors configured for placement in proximity to a landing zone, a tag configured for securement to the UAV where the tag wirelessly communicates with at least three or more of the anchors. A controller may be configured to fly the UAV towards a centerline axis defined through a first airspace zone at a first altitude above the landing zone while descending towards the first altitude and then fly the UAV towards the centerline axis defined through a second airspace zone at a second altitude which is below the first altitude while descending towards the second altitude, and finally to fly the UAV towards the centerline axis defined through a third airspace zone at a third altitude which is below the second altitude while descending towards the landing zone.

20 Claims, 12 Drawing Sheets

(51) Int. Cl.
  *G05D 109/20* (2024.01)
  *G05D 111/30* (2024.01)

(56) References Cited

U.S. PATENT DOCUMENTS

| | | |
|---|---|---|
| 10,371,812 B2 | 8/2019 | Pesik et al. |
| 10,713,958 B2 | 7/2020 | Hobbs et al. |
| 10,946,981 B2 | 3/2021 | Raz et al. |
| 2016/0122038 A1 | 5/2016 | Fleischman et al. |
| 2018/0364740 A1 | 12/2018 | Collins et al. |
| 2019/0023416 A1 | 1/2019 | Borko et al. |
| 2020/0012296 A1 | 1/2020 | Gurdan et al. |
| 2020/0130864 A1 | 4/2020 | Brockers et al. |
| 2020/0156808 A1 | 5/2020 | Mcmillian et al. |
| 2020/0317340 A1 | 10/2020 | Gil et al. |
| 2021/0129982 A1* | 5/2021 | Collins ................ B64C 39/024 |
| 2021/0150458 A1 | 5/2021 | Robinson et al. |
| 2021/0179290 A1 | 6/2021 | Falk-Petersen |
| 2021/0247781 A1* | 8/2021 | Liu ........................ B64U 10/14 |
| 2021/0263537 A1* | 8/2021 | Belt ...................... G08G 5/0034 |
| 2022/0215766 A1* | 7/2022 | Lisoski ................ G08G 5/0069 |

FOREIGN PATENT DOCUMENTS

| | | |
|---|---|---|
| CN | 111352444 | 6/2020 |
| EP | 3 828 087 | 6/2021 |
| WO | WO 2019/182521 | 9/2019 |

OTHER PUBLICATIONS

Arjmandi et al. "Benchmark Dataset of Ultra-Wideband Radio Based UAV Positioning", Jun. 23, 2021.

Nguyen et al. "Post-mission autonomous return and precision landing of UAV", 2018 15th International Conference on Control, Automation, Robotics and Vision (ICARCV) Singapore, Nov. 18-21, 2018.

Nguyen et al. "Robust Target-relative Localization with Ultra-Wideband Ranging and Communication", Apr. 19, 2018.

* cited by examiner

PRECISION LANDING SYSTEM

CROSS-REFERENCE TO RELATED APPLICATIONS

This application claims the benefit of priority to U.S. Prov. 63/366,048 filed Jun. 8, 2022, which is incorporated herein by reference in its entirety.

STATEMENT REGARDING FEDERALLY SPONSORED RESEARCH OR DEVELOPMENT

This invention was made with government support under Contract No.: FA864920C0227 awarded by the Small Business Innovation Research (SBIR) Program. The government has certain rights in the invention.

FIELD OF THE INVENTION

The present invention is related to systems for precision landing of unmanned aerial vehicles. More particularly, the present invention is related to systems configured to precisely land unmanned aerial vehicles upon a landing platform.

BACKGROUND OF THE INVENTION

Unmanned Aerial Vehicles (UAVs) are increasingly being used for commercial applications. Examples include, but are not limited to, security, inspections of railway lines, inspection of electrical power lines, monitoring of quarry sites and construction sites. Commercial UAVs are commonly powered by batteries and may be flown in remote locations necessitating portable UAV landing pads and improved UAV landing solutions.

Conventional UAV landing operations typically utilize beacons which function as a homing device that the UAV can follow for landing. However, such homing devices merely help the UAV to determine a direction towards a landing pad but not in effectively landing the UAV itself. Furthermore, landing can be hampered depending upon weather or visibility conditions. UAVs can also be controlled by a human operator who manually pilots the UAV to the landing pad but this relies heavily upon the individual skills of the pilot and can also be time consuming especially when missions may be time sensitive.

Other methods typically utilize satellite navigation system, optical instruments, inertial navigation systems, or combinations thereof. Yet these solutions are typically less desirable for multiple autonomous UAVs and for smaller scale UAVs.

Accordingly, there is a need for precision landing system for UAVs which enable the efficient and effective landing of UAVs upon a landing zone.

SUMMARY OF THE INVENTION

A precision landing system which enables the UAV to precisely and effectively land upon a designated landing zone such as on the power supply replacement system may incorporate a power supply base station having a housing and a designated landing zone upon the housing can communicate with the UAV for precision landing. The base station may incorporate one or more rechargeable power supplies stored within which can be automatically swapped with a used or spent power supply from a UAV positioned upon the landing zone.

The variation may utilize four "anchors" which are located at each outer corner of the landing zone and a "tag" which is integrated within or upon the UAV and which is configured to wirelessly communicate with the each of the anchors during a landing sequence when the UAV is directed to land upon the landing zone. Each of the anchors and/or tag may further communicate with a controller contained within the base station. The tag may comprise a companion computer having a processor and connectors for coupling to the electronic systems of the UAV and the tag (companion computer) may communicate with the anchors either directly or via the UAV.

During use, as the UAV flies into proximity of the base station for landing (flown towards the base station either manually or automatically via a preset flight plan), the tag may communicate with one or more of the anchors using ultra wideband technology via two-way ranging where the tag may transmit an electronic packet wirelessly at around 20 Hz to the anchors and measures the time for the packet to be echoed back to the tag from one or more of the anchors. By measuring this time-of-flight, the processor in the tag can estimate a distance to those anchors which echo the packet back to the tag. With at least three of the anchors echoing a signal back to the tag, the processor in the tag can estimate its position relative to those anchors in space.

The processor and companion computer in the tag may initiate and process the precision landing sequence by communicating with the onboard flight controller of the UAV and receiving UAV telemetry data such as velocity measurements as well as time-of-flight measurements from the anchors to determine a velocity and relative position of the tag relative to each of the anchors. So long as the tag is in communication with at least three of the four anchors, the companion computer is able to initiate and execute a precision landing sequence for the UAV.

While the controller in the base station may perform an initial safety check to ensure that all anchors are active and functioning properly prior to launching the UAV, one or more of the anchors may fail to function when the UAV is attempting to perform a landing sequence. If only one or two of the anchors are in communication with the tag, then the covariance and ranging errors generated may be too large for the processor and the companion computer may command the UAV to enter a hover mode until sufficient communication with the anchors can be achieved. Although communication with two of the anchors may be sufficient for the companion computer to determine an orientation of the UAV relative to the anchors. If the power fails in the base station such that all anchors fail to communicate with the tag, then the UAV may be commanded by the companion computer to land wherever it can if the power level is insufficient to maintain a hovering mode for the UAV.

When the UAV is initially preparing to take off from a base station either automatically for a predetermined flight plan or manually flown, the companion computer may initialize as part of the flight clearance in advance of a precision landing sequence, as detailed by the flow diagram. As the companion computer in the tag powers on, the precision landing sequence may initialize by the tag transmitting one or more electronic packets wirelessly in proximity to the anchors and await an echo in attempting to establish communication with each of the anchors. If the tag has not received a response from an anchor within a preset time period, such as two minutes, the non-responsive anchor may be considered by the tag to be timed out or inactive. The companion computer may then make a decision depending upon the number of responsive anchors. If the tag is able to connect with three or more of the anchors as well as the flight controller in the UAV, then the initialization is considered successful and the precision landing sequence for the UAV may be determined to be functional.

On the other hand, if fewer than three anchors are responsive, then the companion computer may determine whether the UAV will be launched automatically via the controller within the base station or manually. If the UAV is to be launched via the base station controller, the controller may prevent the UAV from arming and an alert may be sent to the user that the precision landing system is not initializing and that the takeoff is to be aborted. Additional steps such as the power supply or battery being unlocked from the UAV may also be initiated as well.

In the event that the UAV is not being launched via the base station controller, the UAV may be armed and an alert may be sent to the user from the companion computer that the precision landing system has failed to initialize. Because the UAV may be manually launched by the user, normal operations for the UAV may be initiated and the UAV may still be cleared for take-off.

When a UAV in flight is to land upon the landing zone of the base station, the UAV may fly towards the base station until the companion computer in the tag has come into proximity to the landing zone and engaged in communication with at least three of the four anchors. Provided that the tag has suitably engaged with the anchors, the companion computer may initiate a precision landing procedure for landing the UAV effectively and precisely upon the landing zone. The precision landing procedure may effectively divide the airspace above landing zone into several airspace zones within which the companion computer in UAV remains in communication with the anchors and base station and within which the UAV is commanded to fly in a predetermined manner for precision landing. As the UAV flies closer towards the landing zone and anchors, the range accuracy of the UAV relative to the landing zone may also increase.

A failsafe procedure during the precision landing procedure may be activated in the companion computer within the tag in the event that two or more of the anchors are not active, if the UAV is at an altitude of less than, e.g., 15 m, above the landing zone, and/or if the UAV is landed using another procedure. If all of these conditions are present, the failsafe procedure may be actuated automatically in one variation. Other conditions in which a failsafe procedure is activated may include when power may be lost in the base station, if inconsistent power is provided to the anchors, or if any of the anchors are faulty The flight controller may include a proportional-integral-derivative (PID) controller which may be used as a feedback controller to process a control loop that runs on the flight controller for controlling the horizontal (x and y) position of the UAV. A gain function may be used to modify the P-value (proportional function) of the PID controller in order to apply an accurate and responsive correction to the control functionality to adjust the responsiveness of control inputs to the UAV. During flight operations, the PID controller may maintain a P-value at a first level for regular flight operations of the UAV. However, when the UAV enters the descent phase while in the RTL mode, this P-value may be automatically adjusted to a second level which is lower than the first level (e.g., about a 50% reduction in the P-value of the controller PID gains from the first level to the second lower level) in order to begin the precision landing sequence to land upon the landing zone. It is during the descent of the UAV that the gain switch occurs; however, if the UAV leaves the descent phase for any reason, then the P-value gain may revert from its second level back to its higher first level.

Automatically adjusting the P-value of the PID controller allows for the UAV to have relatively smoother adjustments in the horizontal (x and y) flight movements while descending to facilitate a precision landing by dampening any aggressive control inputs to the UAV, particularly when maneuvering within each airspace zone and for landing upon the landing zone.

In the event that some fault occurs and the precision landing procedure is unable to be activated, the flight controller in the UAV or companion computer in the tag may automatically activate a failsafe procedure. Once the precision landing procedure has initialized successfully, the UAV may enter its RTL mode such as at the end of a patrol or mission. As the UAV approaches the base station, the tag and companion computer may attempt to communicate with the anchors and if three or more of the anchors are active and engaged in communication with the tag, the UAV may proceed with the precision landing procedure and land upon the landing zone.

However, if fewer than three of the anchors are in communication with the tag, then an indicator may be alerted on the display to the pilot or user such as a message (e.g., "PL Anchor Failsafe") or other textual or visual indicator or alarm. An auditory indicator or alert may also be played to the pilot or user and looped until the auditory indicator or alert is disarmed by the pilot or user or until the tag reconnects with the appropriate number of anchors. With the text and auditory indicators active, the flight controller or companion computer in the UAV may automatically switch the UAV into a temporary holding or "Brake" mode during which the tag may attempt or wait to connect to the anchors. If reconnection is successful with at least three of the anchors, another message may alert the pilot or user indicating that failsafe has been cleared (e.g., "PL Anchor Failsafe Cleared") and an auditory indicator or alert may also be played to indicate that reconnection has been successful. The pilot or user may manually switch the UAV into its RTL mode or they may allow the companion computer and UAV continue into its precision landing procedure.

Aside from the failsafe procedure described above, the UAV and companion computer may implement alternative failsafe procedures instead. Another failsafe procedure may utilize a precision landing position estimate in which the UAV may be automatically switched to its Brake mode so that the UAV maintains a hovering position when the horizontal position of the UAV is estimated to differ by more than some preset distance (e.g., 8 m or more) from its actual horizontal position. The estimated difference in horizontal position may be due to any number of errors such as a faulty GPS reading, bad state estimate, etc.

One variation of a precision landing system for an unmanned aerial vehicle (UAV) may generally comprise one or more anchors configured for placement in proximity to a landing zone, a tag configured for securement to the UAV, wherein the tag is further configured to wirelessly communicate with at least three or more of the anchors when the UAV is in proximity to the landing zone, a controller in communication with the tag, wherein the controller is configured to fly the UAV towards a centerline axis defined through a first airspace zone defined at a first altitude above the landing zone while descending towards the first altitude, wherein the controller is further configured to fly the UAV towards the centerline axis defined through a second airspace zone defined at a second altitude above the landing zone which is below the first altitude while descending towards the second altitude, and wherein the controller is further configured to fly the UAV towards the centerline axis defined through a third airspace zone defined at a third altitude above the landing zone which is below the second altitude while descending towards the landing zone.

One variation for a method for precision landing of an unmanned aerial vehicle (UAV) may generally comprise initializing wireless communication between a tag secured to a UAV in flight and with one or more anchors positioned in proximity to a landing zone, communicating between the tag and with at least three or more of the anchors, actuating the UAV to fly towards a centerline axis defined through a first airspace zone defined at a first altitude above the landing zone while descending towards the first altitude, further actuating the UAV to fly towards the centerline axis defined through a second airspace zone defined at a second altitude above the landing zone which is below the first altitude while descending towards the second altitude, and further actuating the UAV to fly towards the centerline axis defined through a third airspace zone defined at a third altitude above the landing zone which is below the second altitude while descending towards the landing zone.

BRIEF DESCRIPTION OF THE DRAWINGS

The detailed description is described with reference to the accompanying figures.

DETAILED DESCRIPTION OF THE INVENTION

An unmanned system which can provide command and control support as well as supply power via an automated power supply replacement system may incorporate a precision landing system upon the power supply replacement system which can communicate wirelessly with a corresponding system integrated within or upon the UAV. Such a system enables the UAV to precisely and effectively land upon a designated landing zone such as on the power supply replacement system.

Examples of UAVs and UAV systems which may be used with any of the embodiments described herein are described in further detail in U.S. Pat. Nos. 9,969,285; 9,783,075; 11,318,859; U.S. Pat. Pub. 2021/0284335; and U.S. patent application Ser. No. 17/657,690 filed Apr. 1, 2022, each of which is incorporated herein by reference in its entirety and for any purpose.

Figure 1:
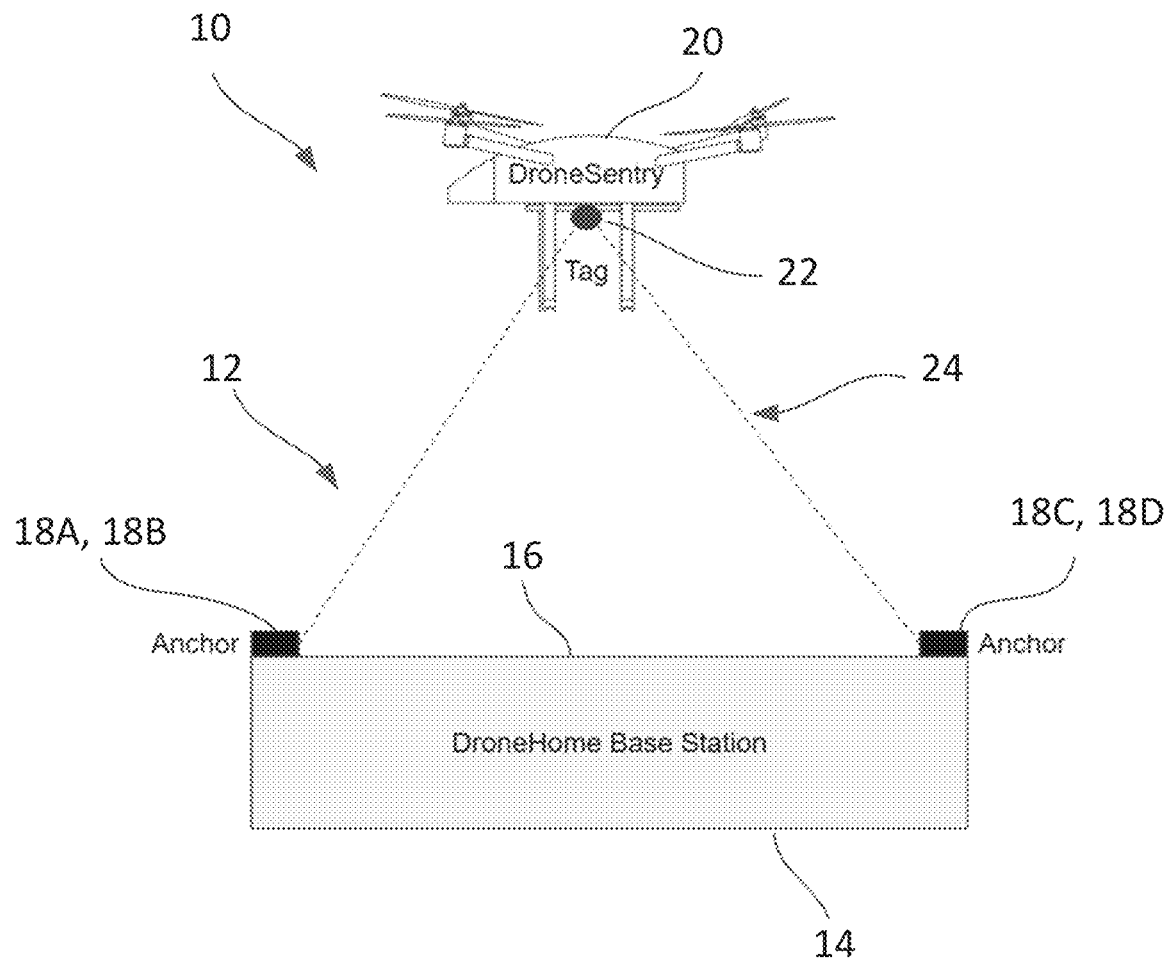
FIG. 1 illustrates an example of a precision landing system in which a power supply base station having a housing and a designated landing zone upon the housing can communicate with the UAV for precision landing.

FIG. 1 illustrates an example of a precision landing system 10 in which a power supply base station 12 having a housing 14 and a designated landing zone 16 upon the housing 14 can communicate with the UAV 20 for precision landing. The base station 12 may incorporate one or more rechargeable power supplies stored within which can be automatically swapped with a used or spent power supply from a UAV 20 positioned upon the landing zone 16. Examples of replaceable power supply systems are described in further detail in the above-referenced patent references.

The variation shown illustrates one or more "anchors", for example, four anchors 18A, 18B, 18C, 18D which are located at each outer corner of the landing zone 16 and a "tag" 22 which is integrated within or upon the UAV 20 and which is configured to wirelessly communicate 24 with the each of the anchors 18A-18D during a landing sequence when the UAV 20 is directed to land upon the landing zone 16. Each of the anchors 18A-18D and/or tag 22 may include an antenna and a transmitter and/or receiver utilizing ultra wideband (UWB) technology and which may further communicate wirelessly with a controller contained within the base station 12.

Figure 2A:
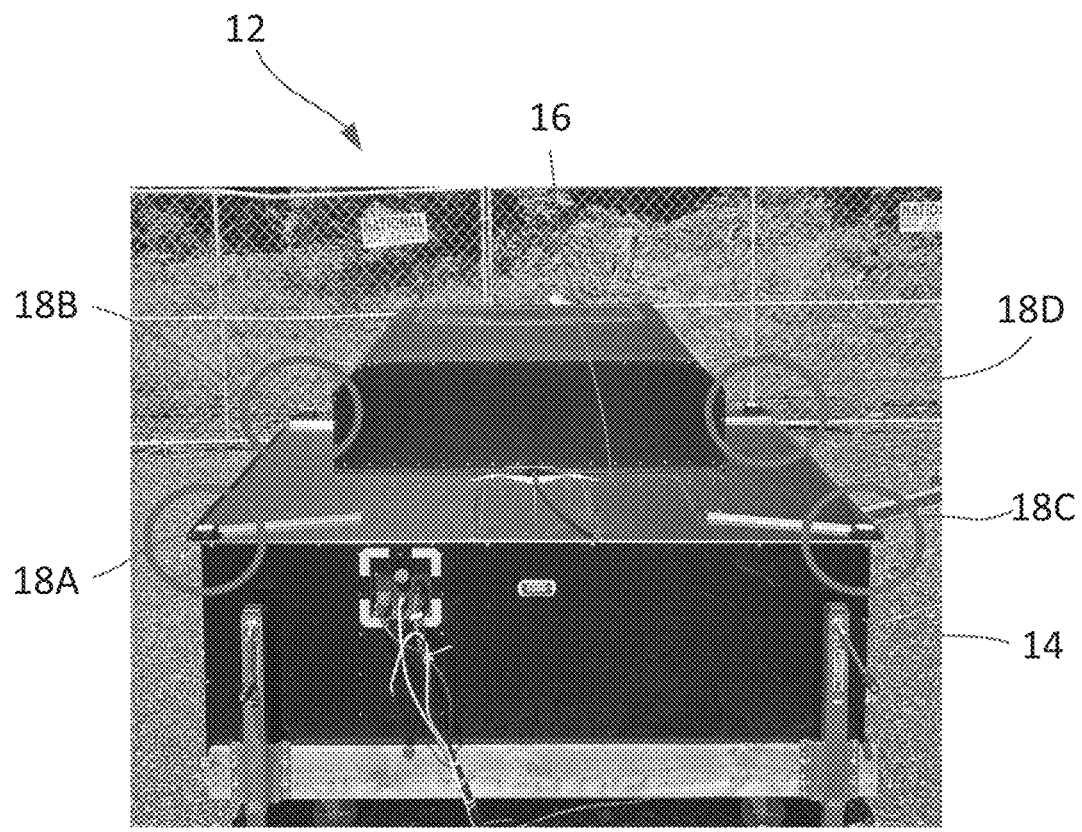
FIG. 2A illustrates a perspective view of one variation of the base station having a landing zone designated upon the housing and anchors located upon or otherwise integrated at each corner of the landing zone.
Figure 2B:
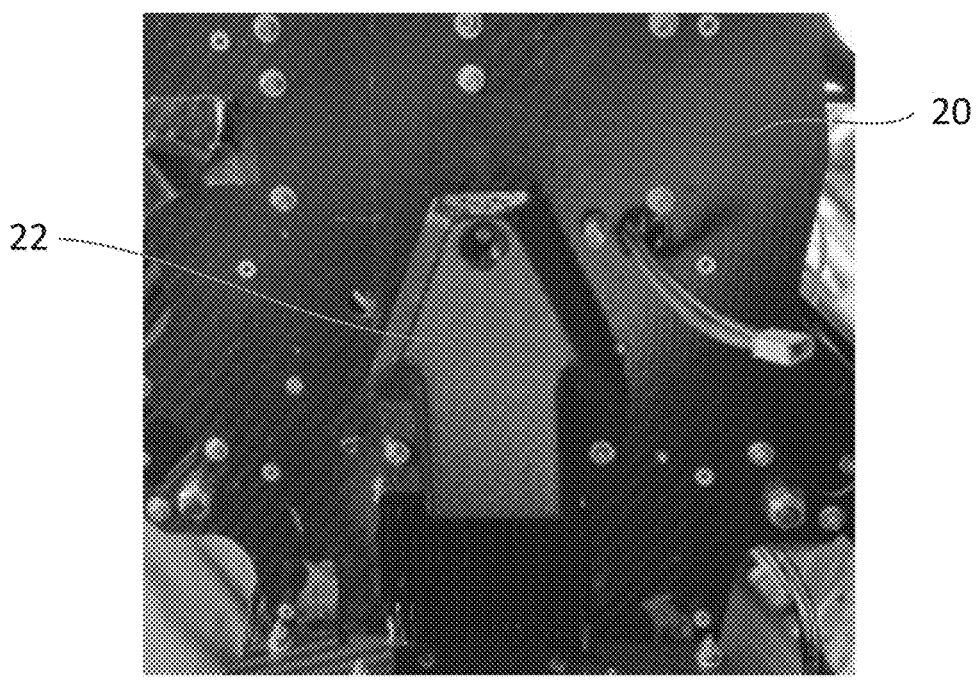
FIG. 2B illustrates the underside of UAV to show how the tag may be mounted upon or within the UAV for electrical connection to the UAV.
Figure 2C:
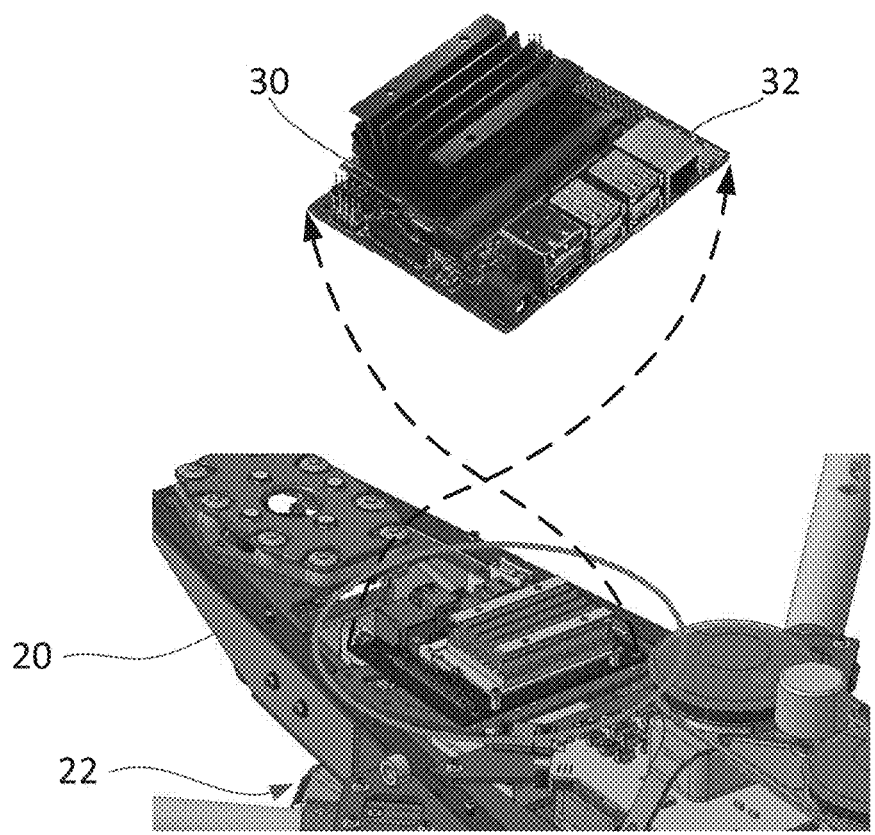
FIG. 2C illustrates a perspective view of a companion computer mounted upon the UAV and which is in communication with the tag.

FIG. 2A illustrates a perspective view of one variation of the base station 12 having a landing zone 16 designated upon the housing 14. Each of the anchors 18A-18D may be seen located upon or otherwise integrated at each corner of the landing zone 16. FIG. 2B illustrates the underside of UAV 20 to show how the tag 22 may be mounted upon or within the UAV 20 for electrical connection to the UAV 20. The tag 22 may comprise a transmitter/receiver component which is in communication with a companion computer, mounted upon the UAV 20 as shown in the perspective view of FIG. 2C, having a processor 30 and connectors 32 for coupling to the electronic systems of the UAV 20 and the tag 22 (including the companion computer) may communicate with the anchors 18A-18D either directly or via the UAV 20. While the tag 22 may be mounted on the underside of the UAV 20, as illustrated, for unhindered communication with the anchors 18A-18D, the tag 22 may instead be mounted on other locations within or upon the UAV 20. Similarly, the companion computer may be mounted above, upon, within or below the UAV 20, as desired or as practicable.

During use, as the UAV 20 flies into proximity of the base station 12 for landing (flown towards the base station 12 either manually or automatically via a preset flight plan), the tag 22 may communicate with one or more of the anchors 18A-18D using UWB technology via two-way ranging where the tag 22 may transmit an electronic packet wirelessly at around 20 Hz to the anchors 18A-18D and measures the time for the packet to be echoed back to the tag 22 from one or more of the anchors 18A-18D. By measuring this time-of-flight, the processor 30 can estimate a distance to those anchors 18A-18D which echo the packet back to the tag 22. With at least three of the anchors 18A-18D echoing a signal back to the tag 22, the processor 30 can estimate its position relative to those anchors 18A-18D in space.

The processor 30 and companion computer may initiate and process the precision landing sequence by communicating with the onboard flight controller of the UAV 20 and receiving UAV telemetry data such as velocity measurements as well as time-of-flight measurements from the anchors 18A-18D to determine a velocity and relative position of the tag 22 relative to each of the anchors 18A-18D. So long as the tag 22 is in communication with at least three of the four anchors 18A-18D, the companion computer is able to initiate and execute a precision landing sequence for the UAV 20.

While the controller in the base station 12 may perform an initial safety check to ensure that all anchors 18A-18D are active and functioning properly prior to launching the UAV 20, one or more of the anchors 18A-18D may fail to function when the UAV 20 is attempting to perform a landing sequence. If only one or two of the anchors 18A-18D are in communication with the tag 22, then the covariance and ranging errors generated may be too large for the processor 30 and the companion computer may command the UAV 20 to enter a hover mode until sufficient communication with the anchors 18A-18D can be achieved. Although communication with two of the anchors 18A-18D may be sufficient for the companion computer to determine an orientation of the UAV 20 relative to the anchors 18A-18D. If the power fails in the base station 12 such that all anchors 18A-18D fail to communicate with the tag 22, then the UAV 20 may be commanded by the companion computer to land wherever it can if the power level is insufficient to maintain a hovering mode for the UAV 20.

Figure 3:
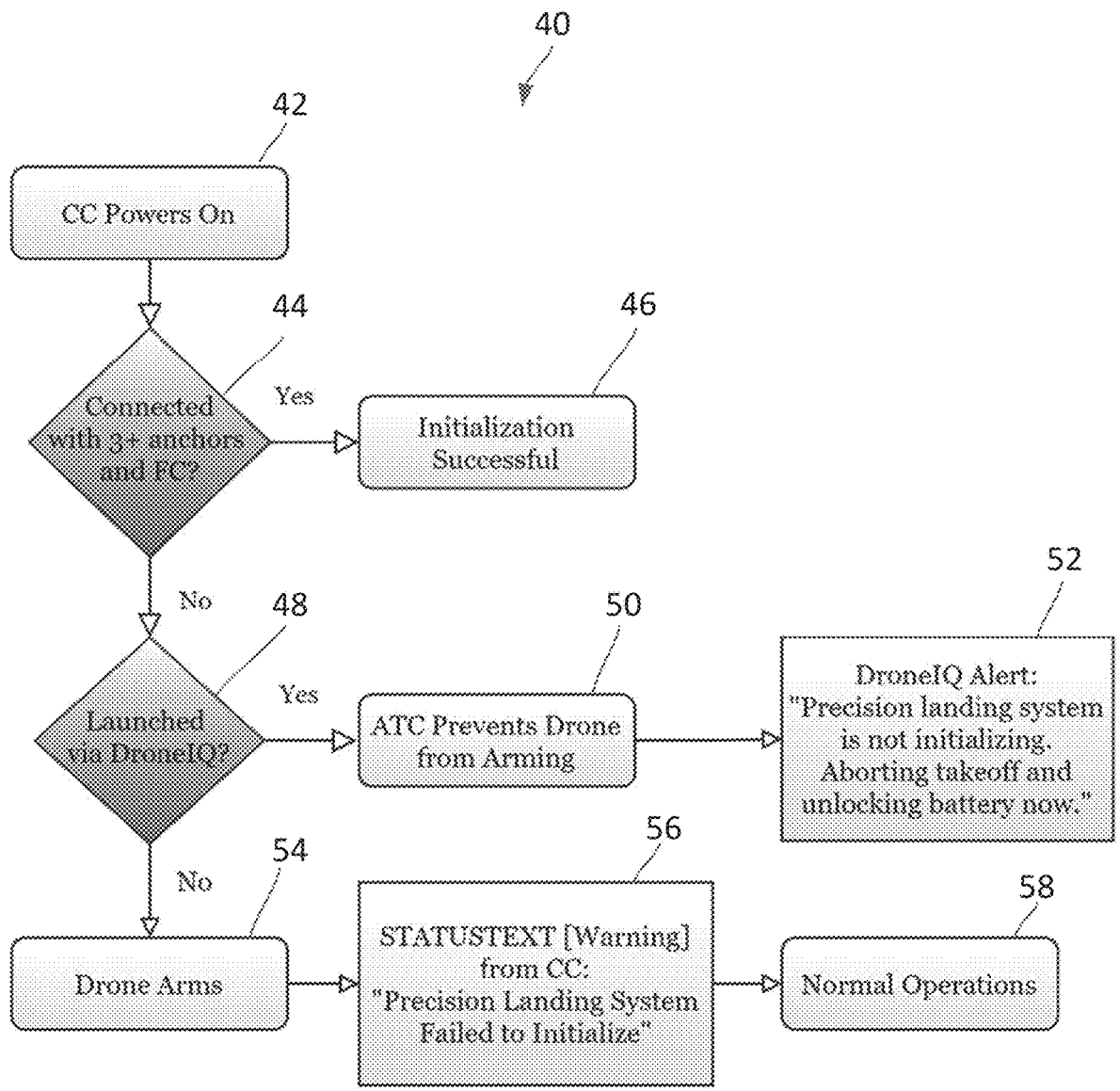
FIG. 3 illustrates a flow diagram how the companion computer may initialize as part of the flight clearance in advance of a precision landing sequence.

When the UAV 20 is initially preparing to take off from a base station 12 either automatically for a predetermined flight plan or manually flown, the companion computer may initialize as part of the flight clearance in advance of a precision landing sequence, as detailed by the flow diagram 40 shown in FIG. 3. As the companion computer in the tag 22 powers on 42, the precision landing sequence may initialize by the tag 22 transmitting one or more electronic packets wirelessly in proximity to the anchors 18A-18D and await an echo in attempting to establish communication with each of the anchors 18A-18D. If the tag 22 has not received response from an anchor within a preset time period, such as two minutes, the non-responsive anchor may be considered by the tag 22 to be timed out or inactive. The companion computer may then make a decision 44 depending upon the number of responsive anchors. If the tag 22 is able to connect with three or more of the anchors 18A-18D as well as the flight controller in the UAV 20, then the initialization is considered successful 46 and the precision landing sequence for the UAV 20 may be determined to be functional.

On the other hand, if fewer than three anchors 18A-18D are responsive, then the companion computer may determine 48 whether the UAV 20 will be launched automatically via the controller within the base station 12 or manually. If the UAV 20 is to be launched via the base station 12 controller, the controller may prevent the UAV 20 from arming 50 and an alert 52 may be sent to the user that the precision landing system is not initializing and that the takeoff is to be aborted. Additional steps such as the power supply or battery being unlocked from the UAV 20 may also be initiated as well.

In the event that the UAV 20 is not being launched via the base station controller, the UAV 20 may be armed 54 and an alert may be sent 56 to the user from the companion computer that the precision landing system has failed to initialize. Because the UAV 20 may be manually launched by the user, normal operations 58 for the UAV 20 may be initiated and the UAV 20 may still be cleared for take-off.

Figure 4A:
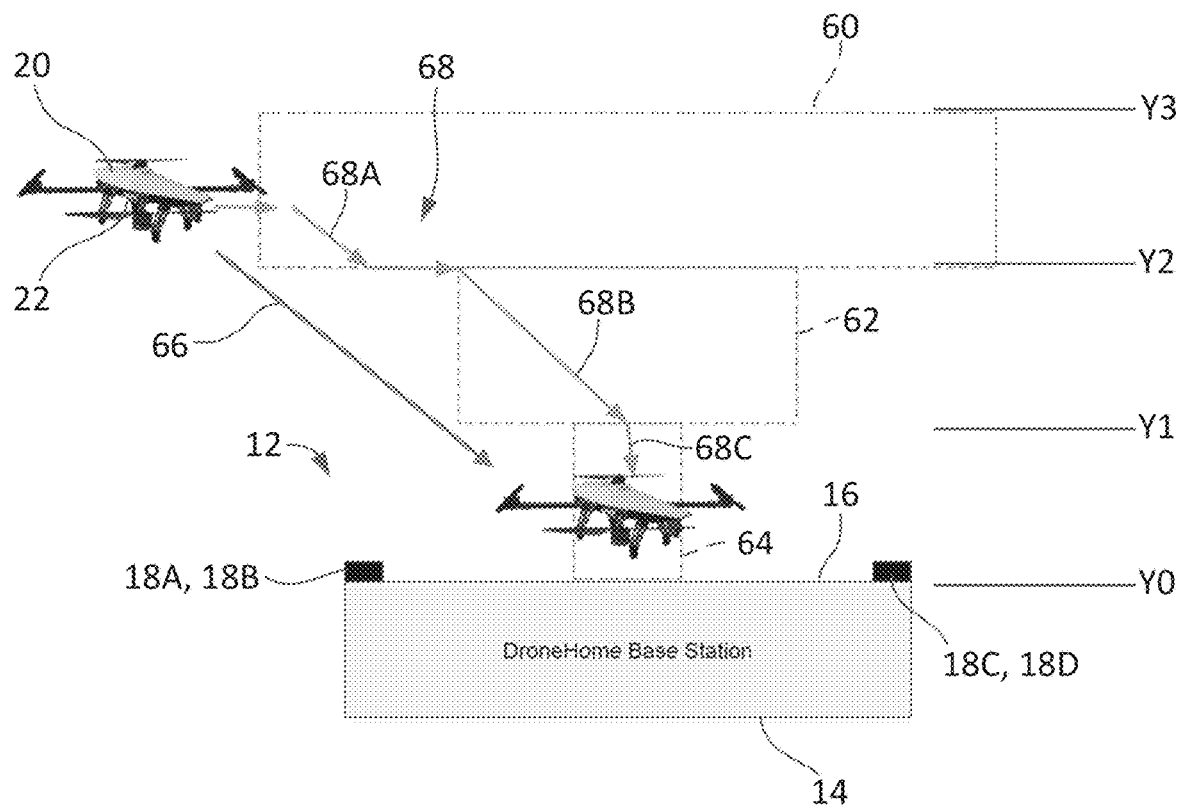
FIG. 4A illustrates how the UAV may fly towards the base station until the companion computer and the tag has come into proximity to the landing zone and engaged in communication with at least three of the four anchors.

When a UAV 20 in flight is to land upon the landing zone 16 of the base station 12, the UAV 20 may fly towards the base station 12 until the companion computer in the tag 22 has come into proximity to the landing zone 16 and engaged in communication with at least three of the four anchors 18A-18D, as described herein, and as further illustrated in FIG. 4A. Provided that the tag 22 has suitably engaged with the anchors 18A-18D, the companion computer may initiate a precision landing procedure for landing the UAV 20 effectively and precisely upon the landing zone 16. The precision landing procedure may effectively divide the airspace above landing zone 16 into several airspace zones within which the companion computer in UAV 20 remains in communication with the anchors 18A-18D and base station 12 and within which the UAV 20 is commanded to fly in a predetermined manner for precision landing.

Figure 4B:
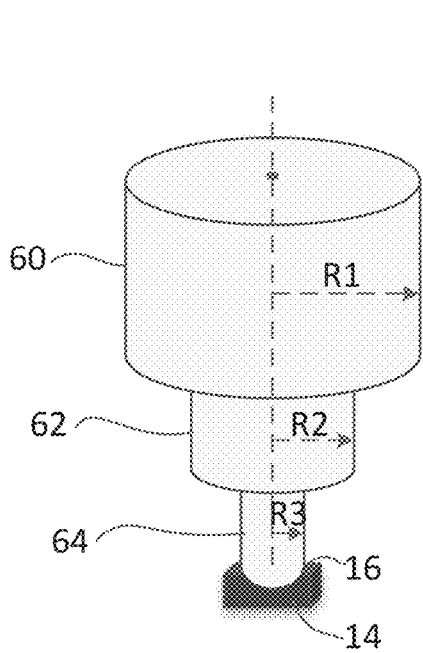
FIG. 4B illustrates a perspective view of an example of how the airspace may be partitioned above the landing zone.

FIG. 4B illustrates a perspective view of an example of how the airspace may be partitioned above the landing zone 16. A first airspace zone 60 may be defined as a cylindrical region between about, e.g., 25-50 m, above the landing zone 16 and having a radius of about, e.g., 3 m, symmetrically relative to an imaginary center line axis CL rising above the center of landing zone 16, as shown. A second airspace zone 62 may be defined as a cylindrical region between about, e.g., 15-25 m, above the landing zone 16 and having a radius of about, e.g., 1.5 m, symmetrically relative to the imaginary center line axis CL rising above the landing zone 16. The second airspace zone 62 may be located just below the first airspace zone 60. A third airspace zone 64 may also be defined as a cylindrical region between about, e.g., 0-15 m, above the landing zone 16 and having a radius of about, e.g., 0.75 m, symmetrically relative to the imaginary center line axis CL rising above the landing zone 16. The third airspace zone 64 may be located just below the second airspace zone 62 and above the landing zone 16 such that each subsequent airspace zone above the landing zone 16 may represent a tiered airspace zone relatively larger than the one just below where the third airspace zone 64 may range from a "ground" level (level above the landing zone 16) of an altitude Y0 to Y1 (e.g., 0-15 m), the second airspace zone 62 may range from an altitude Y1 to Y2 (e.g., 15-25 m), and the first airspace zone 60 may range from an altitude Y2 to Y3 (e.g., 25-50 m).

Once the UAV 20 is within one of the airspace zones, e.g., within 20-30 m altitude above the landing zone 16, the UAV 20 may begin its precision landing sequence where the UAV 20 may be commanded to first fly towards the center line axis CL representing the center of the landing zone 16 within the airspace zone until the lower airspace zone is reached where the UAV 20 may then descend into the lower airspace zone while continuing to fly towards the center line axis CL. As the UAV 20 flies closer towards the landing zone 16 and anchors 18A-18D, the range accuracy of the UAV 20 relative to the landing zone 16 may also increase. An example is illustrated in FIG. 4A where the UAV 20 is shown entering the first airspace zone 60. As the UAV 20 enters the zone 60, it may be commanded to fly towards the center line axis CL while descending within first airspace zone 60 to the lower altitude level Y2 of the zone 60, as illustrated by the first flightpath 68A. Once the UAV 20 has reached the outer boundary of the second airspace zone 62, the UAV 20 may begin to descend within the zone 62 towards the lower altitude level Y1 while also continuing to fly towards the center line axis CL, as illustrated by the second flightpath 68B, until the UAV 20 then enters the third airspace zone 64 where once the UAV 20 has reached the center line axis CL, the UAV 20 may then descend towards the landing zone 16, as illustrated by the third flight path 68C, at lower altitude level Y0 while maintaining communication with the anchors 18A-18D until the UAV 20 finally touches down upon the landing zone 16.

In this manner, the UAV 20 may continue its descent towards the landing zone 16 while continuing its horizontal flight. Rather than having the UAV 20 track towards the center of the landing zone 16 prior to beginning its descent in a straight line down, the descending flightpath instead results in a stepped, angled descent towards the landing zone 16 so that the UAV 20 does not need to remain centered above the landing zone 16 and results in a more efficient descent while still maintaining precision landing capabilities.

When the UAV 20 is within an airspace zone, the companion computer within the UAV 20 may be programmed to descend vertically only within each respective airspace zone and may be further programmed to fly only horizontally if outside a respective airspace zone. The altitudes (heights) and radius of each airspace zone and the number of airspace zones are described for illustrative purposes as fewer than three airspace zones, e.g., one or two zones, or more than three airspace zones, e.g., four or more, may be utilized. Furthermore, the altitudes and radius of each airspace zone may also be varied in other embodiments.

Use of the predefined airspace zones may also be toggled off prior to or during landing of the UAV 20 upon the landing zone 16 and the UAV 20 may be manually landed instead or landed using other methods. Flightpath 66 illustrates the landing flightpath that the UAV 20 would otherwise take in descending towards the landing zone 16 without utilizing the precision landing procedure in which case the landing and/or orientation of the UAV 20 relative to the landing zone 16 may be inaccurate.

A failsafe procedure during the precision landing procedure may be activated in the companion computer within the tag 22 in the event that two or more of the anchors 18A-18D are not active, if the UAV 20 is at an altitude of less than, e.g., 15 m, above the landing zone 16, and/or if the UAV 20 is landed using another procedure. If all of these conditions are present, the failsafe procedure may be actuated automatically in one variation. Other conditions in which a failsafe procedure is activated may include when power may be lost in the base station 12, if inconsistent power is provided to the anchors 18A-18D, or if any of the anchors 18A-18D are faulty. The failsafe procedure is described in further detail herein.

Figure 4C:
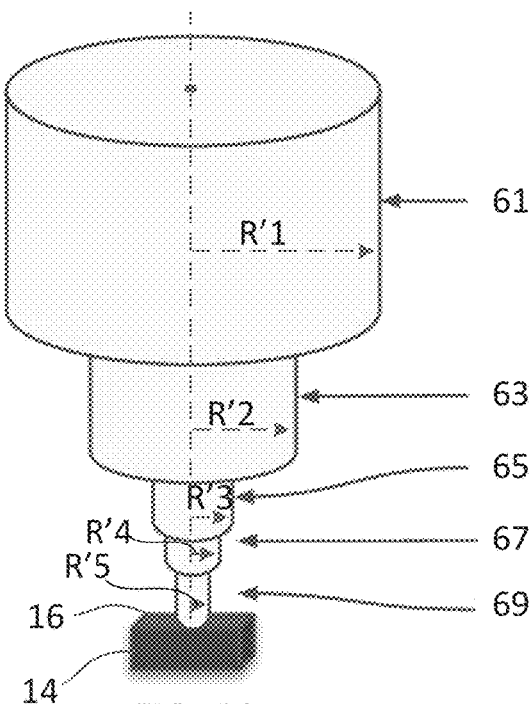
FIG. 4C illustrates a perspective view of another example of how the airspace may be partitioned above the landing zone.

As described above, the number of airspace zones may be varied to be fewer than three or greater than three and the altitudes and radius of each respective airspace zone may be varied in different embodiments. FIG. 4C shows another example in the perspective view to illustrate an embodiment utilizing five different airspace zones where each subsequent airspace zone the higher in altitude has a radius which is greater than the airspace zone immediately below. The altitude of each respective airspace zone may be uniform between one another or they may be varied in altitude between different zones. The first airspace zone 61 is shown as a cylindrical region having a relatively larger radius R'1, e.g., 3.00 m, and an altitude of between, e.g., 30 m and 25 m, than the second airspace zone 63 having a relatively smaller radius R'2, e.g., 1.50 m, and an altitude of between, e.g., 25 m and 15 m. The subsequent third airspace zone 65 may have a relatively smaller radius R'3, e.g., 0.75 m, and an altitude of between, e.g., 15 m and 10 m; the subsequent fourth airspace zone 67 may have a relatively smaller radius R'4, e.g., 0.55 m, and an altitude of between, e.g., 10 m and 3 m; and subsequent fifth airspace zone 69 may have a relatively smaller radius R'5, e.g., 0.45 m, and an altitude of between, e.g., 3 m and 0 m. Each of the airspace zones may be symmetrically aligned relative to the imaginary center line axis CL rising above the center of landing zone 16, as shown.

Figure 4D:
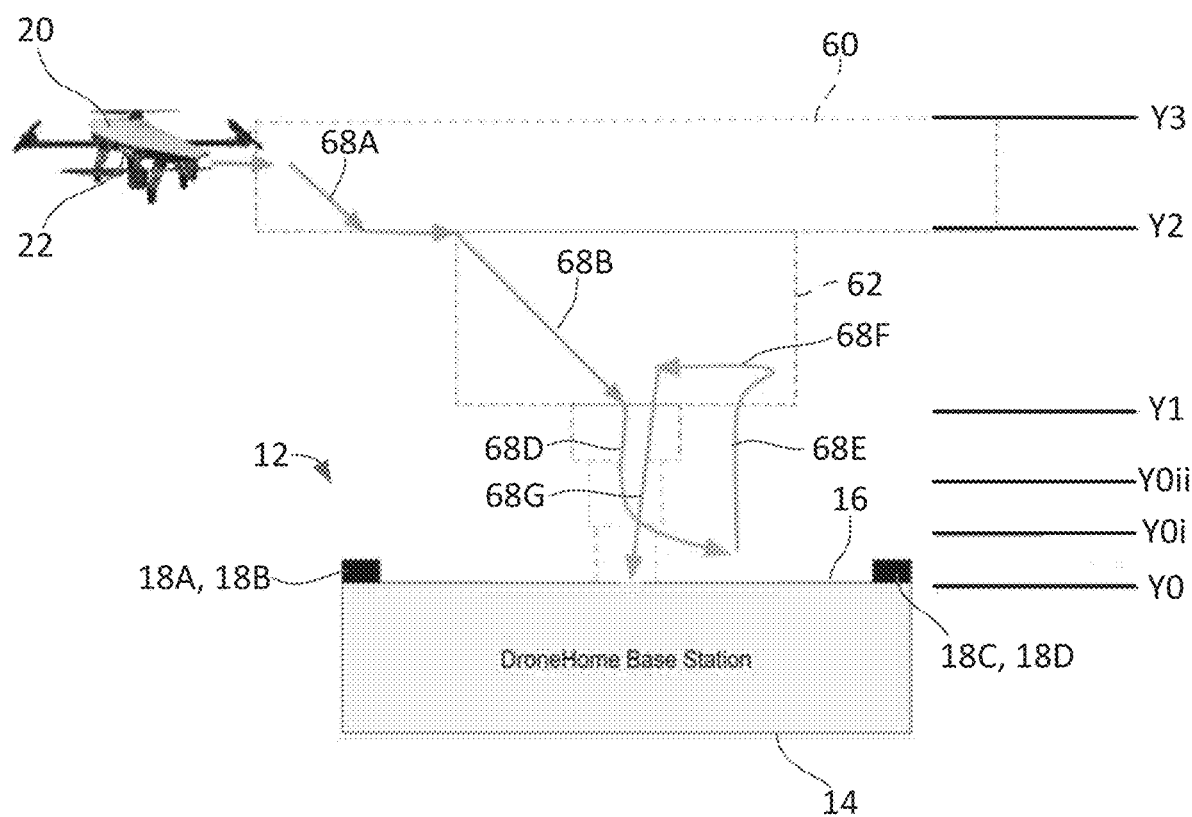
FIG. 4D illustrates an alternative precision landing procedure for landing the UAV.

An alternative precision landing procedure for landing the UAV 20 effectively and precisely upon the landing zone 16 is further illustrated in the schematic view of FIG. 4D. Similar to the precision landing pattern described above, the UAV 20 may proceed to follow the first flightpath 68A and second flightpath 68B through respective first airspace zone 60 and second airspace zone 62 at a descent rate of, e.g., 2.0 m/s, until the UAV 20 reaches an altitude of, e.g., 30 m. Once the UAV 20 drops below the second airspace zone 62, the third airspace zone 64 described above may be further partitioned into additional airspace zones with each subsequent zone decreasing in radius, as shown, at a descent of, e.g., 2.0 m/s, while actively centering itself over the station. Each subsequent zone may range in altitude from, e.g., Y0 to Y0i (e.g., 0-3 m), Y0i to Y0ii (e.g., 3-10 m), Y0ii to Y1 (e.g., 10-15 m), Y1 to Y2 (e.g., 15-25 m), and Y2 to Y3 (e.g., 25-30 m). While three additional airspace zones may be partitioned, the zone may be partitioned alternatively into two zones or more than three zones, as practicable. Once the UAV 20 has descended to an altitude of, e.g., 13 m, the UAV 20 may slow its vertical descent to, e.g., 0.4 m/s, until is descends and lands upon the landing zone 16.

The UAV 20 may accordingly follow its flightpath 68D until it has entered the lowest airspace zone between Y0 to Y0i (e.g., 0-3 m with a radius of 0.45 m) where the UAV 20 has an altitude of less than 3 m from the landing zone 16. If the UAV 20 is determined to be outside of the airspace zone for longer than a predetermined period of time, e.g., 10 sec or greater, the controller may enter failsafe mode in which the UAV 20 may be directed by the controller to follow an alternate flightpath 68E such that the UAV 20 is commanded to fly away from the base station 12 by a few meters and regain altitude to at least altitude Y1, e.g., 15 m, in order to reattempt a precision landing. The UAV 20 may then follow its repositioning flightpath 68F to then reattempt a precision landing, as described herein and as illustrated by flightpath 68G, until the UAV 20 lands upon the landing zone 16. This failsafe reattempt may be completely hands-off such that the reattempted precision landing may occur without any manual intervention from a pilot.

Figure 5A:
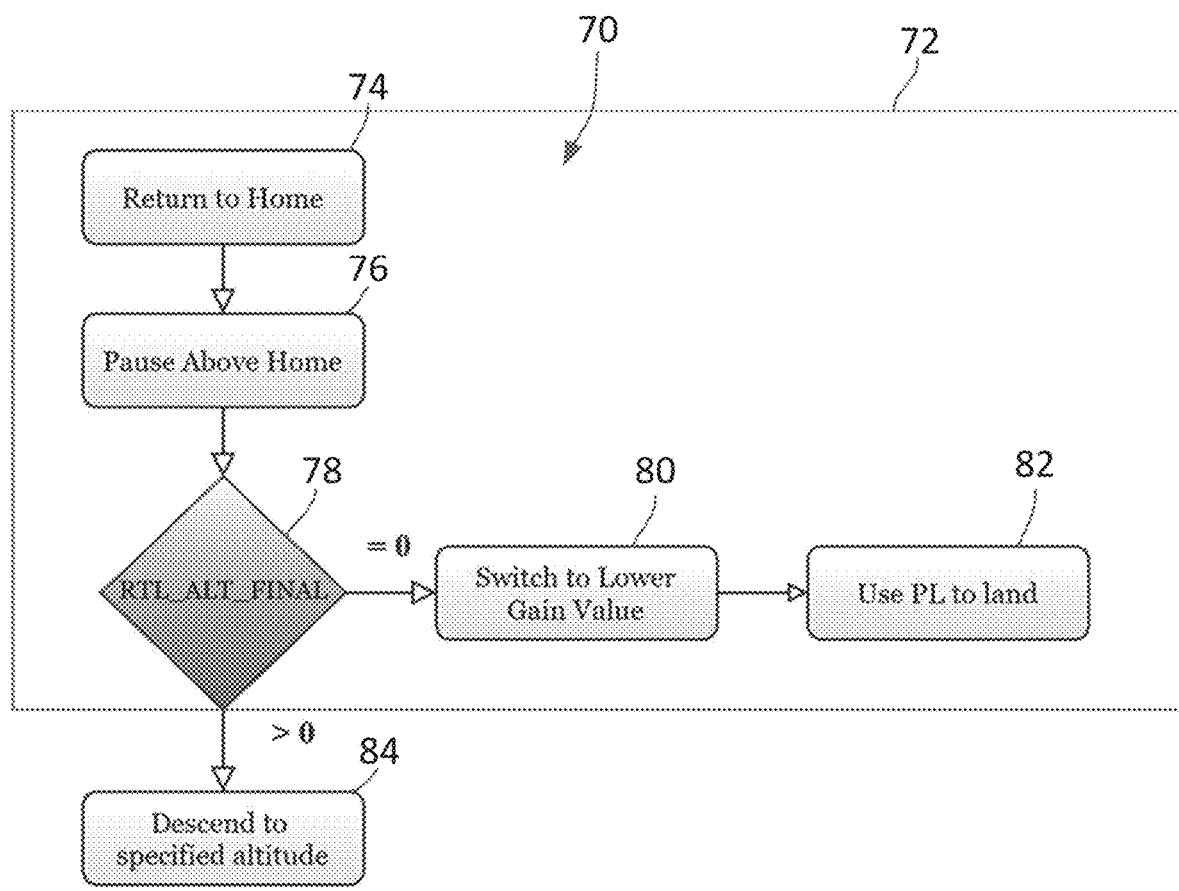
FIG. 5A illustrates an example in a flow diagram of how the gain value may be adjusted in controlling the UAV to land on a particular base station using precision landing.

As part of the precision landing procedure, the flight controller in the UAV 20 may be adjusted to improve the responsiveness of the UAV 20 for a precision landing procedure. FIG. 5A illustrates an example in the flow diagram 70 of how the UAV 20 may be controlled 72 where once the UAV 74 is commanded to return to home 74 or to land on a particular base station 12, the UAV 76 may approach the landing zone 16 from its typical cruising altitude of around 75-90 meters and provided that the tag 22 on the UAV 20 is in adequate communication with the one or more anchors 18A-18D, the UAV 20 may orient its heading to align with the base station 12 and then pause 76 when above or in proximity to the base station 12 where the flight controller (which may be contained either within the UAV 20 or the companion computer within the tag 22 mounted upon the UAV 20) may enter a return-to-launch (RTL) mode 78 to begin a landing sequence. If the flight controller exits from the RTL mode for any reason (e.g., a fault, manual release by the pilot taking control, switching to a different mode, etc.), the UAV 20 may descend to a specified altitude 84 rather than performing a precision landing.

The flight controller may include a proportional-integral-derivative (PID) controller which may be used as a feedback controller to process a control loop that runs on the flight controller for controlling the horizontal (x and y) position of the UAV 20. A gain function may be used to modify the P-value (proportional function) of the PID controller in order to apply an accurate and responsive correction to the control functionality to adjust the responsiveness of control inputs to the UAV 20. During flight operations, the PID controller may maintain a P-value at a first level for regular flight operations of the UAV 20. However, when the UAV 20 enters the descent phase while in the RTL mode, this P-value may be automatically adjusted to a second level which is lower than the first level (e.g., about a 50% reduction in the P-value of the controller PID gains from the first level to the second lower level) in order to begin the precision landing sequence to land 82 upon the landing zone 16. It is during the descent of the UAV 20 that the gain switch occurs; however, if the UAV 20 leaves the descent phase for any reason, then the P-value gain may revert from its second level back to its higher first level.

Figure 5B:
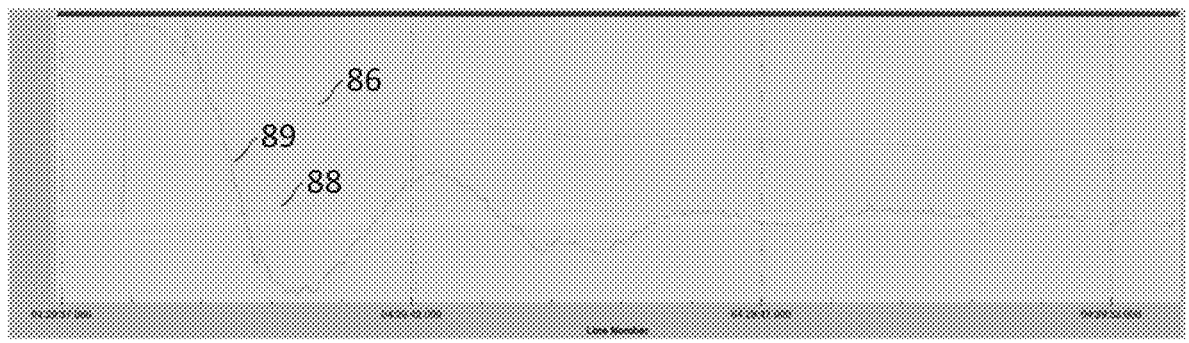
FIGS. 5B and 5C illustrate an example of how the automated gain control may help to improve the horizontal flight control of the UAV during a precision landing sequence by critically dampening the input signals so that the resulting movements of the UAV are smoother than they would be otherwise.

Automatically adjusting the P-value of the PID controller allows for the UAV 20 to have relatively smoother adjustments in the horizontal (x and y) flight movements while descending to facilitate a precision landing by dampening any aggressive control inputs to the UAV 20, particularly when maneuvering within each airspace zone and for landing upon the landing zone 16. FIG. 5B illustrates an example of how the automated gain control may help to improve the horizontal flight control of the UAV 20 during a precision landing sequence by critically dampening the input signals so that the resulting movements of the UAV 20 are smoother than they would be otherwise. The plot over time illustrates the recorded readings of altitude 86 and horizontal readings from the x-offset 88 and y-offset 89 of a UAV 20 during landing without the reduction of the P-value gain. As shown, the y-offset 89 in particular illustrates an under-dampening of the horizontal y-offset 89 which results in an overshooting of the targeted landing zone 16 during UAV 20 descent.

Figure 5C:
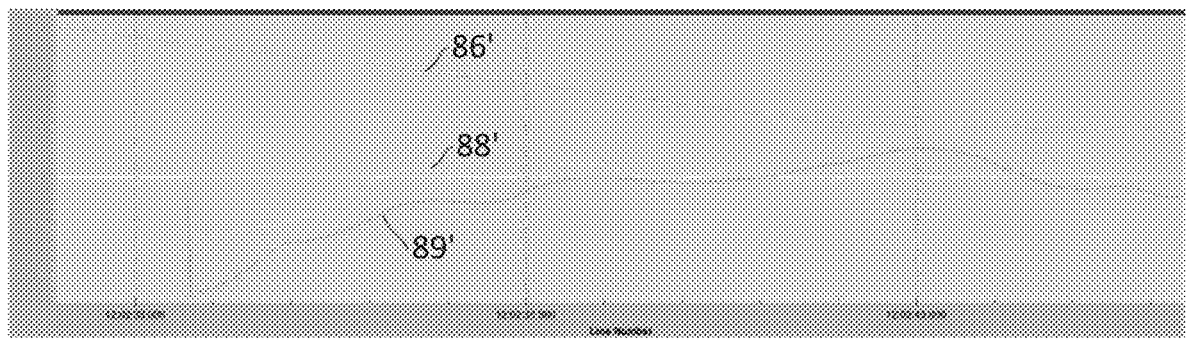

In comparison, FIG. 5C illustrates an example where the P-value gain control has been reduced accordingly. While the altitude 86' (descent) remains relatively unchanged, the resulting x-offset 88' and y-offset 89' of the UAV 20 illustrates a less aggressive horizontal movement correlating to a critically dampened response. The resulting UAV 20 movement is a smooth and controlled adjustment towards the targeted landing zone 16 for a precision controlled landing.

Figure 6:
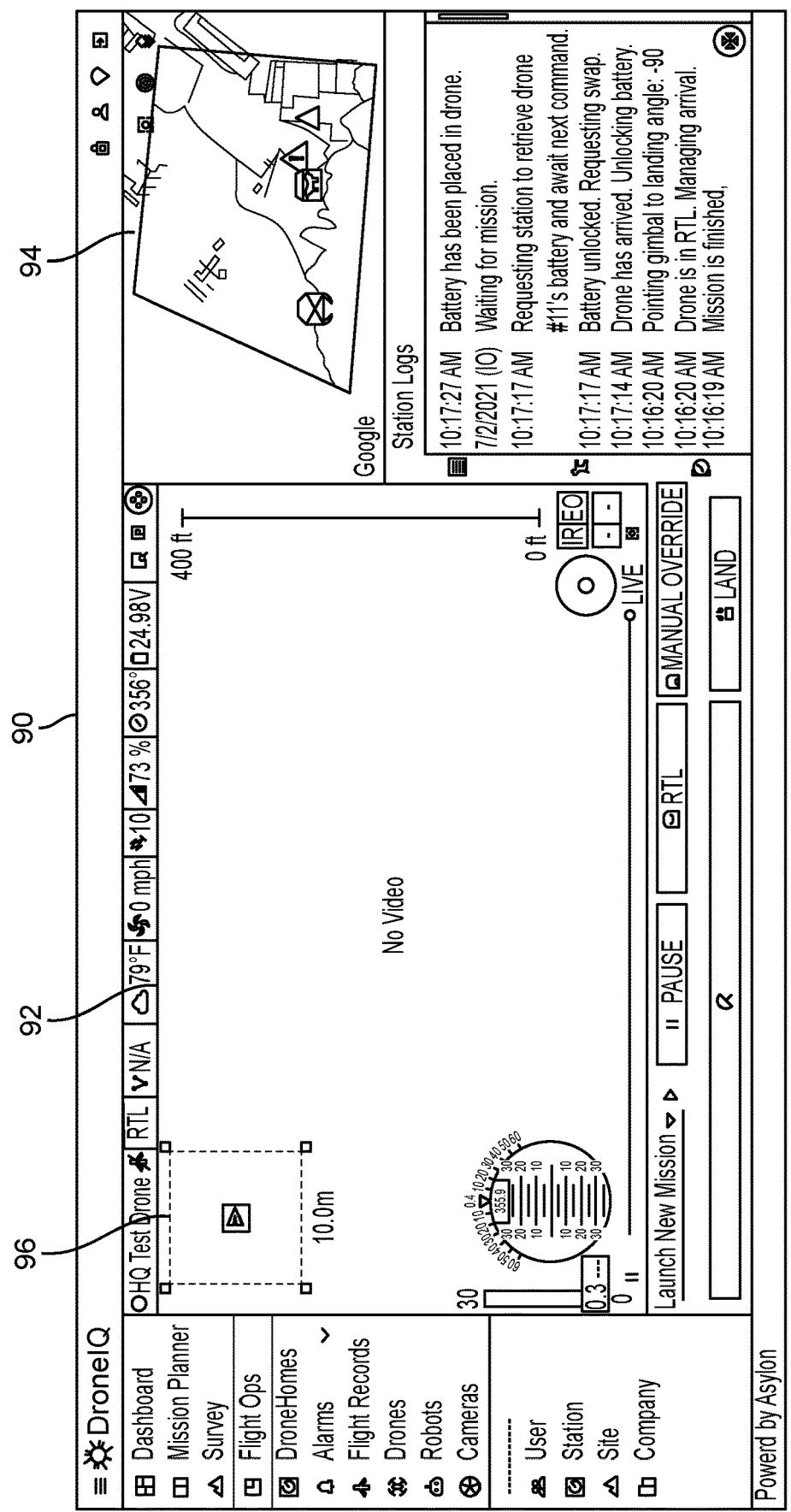
FIG. 6 illustrates one example of a graphical user interface integrating a precision landing indicator on the graphical user interface.

Implementing the precision landing for the pilot or user may be done by graphically integrating a precision landing indicator on the graphical user interface 90 that the pilot or user may typically interface with for flight missions. FIG. 6 illustrates one example of the graphical user interface 90 where visual field 92 may represent the visual images relayed by the UAV 20 during a mission. An overview map 94 may also be seen illustrating the patrol area as well as any waypoints for a flight path and precision landing indicator 96 may also be integrated within the graphical user interface 90 to provide a quick, intuitive indicator to the pilot or user of the UAV 20 positioning during a precision landing procedure. Any variety of graphical user interface 90 may be implemented and the illustration provided is intended to be one possible variation.

Figure 7A:
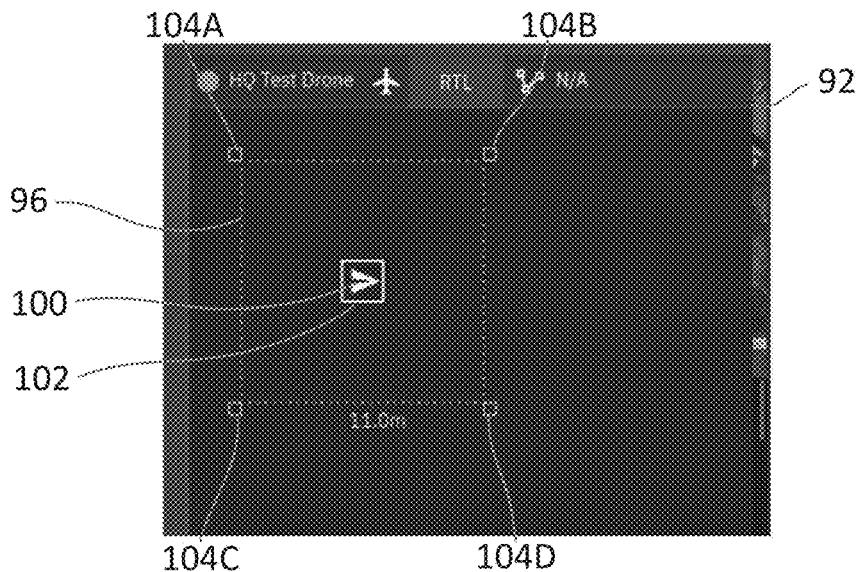
FIGS. 7A to 7C illustrate one example of the precision landing indicator which may optionally remain hidden during normal flight operations but which appear on the graphical user interface when the precision landing procedure is initiated during UAV landing.
Figure 7B:
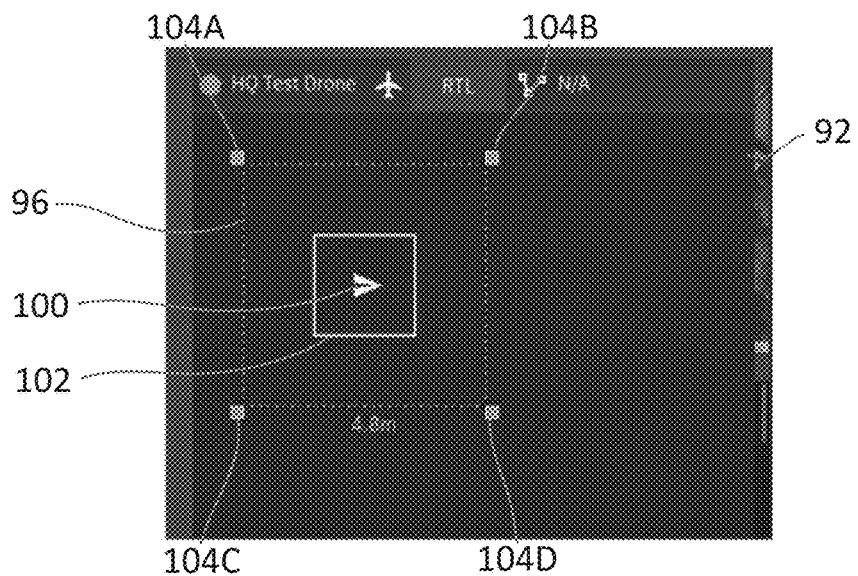
Figure 7C:
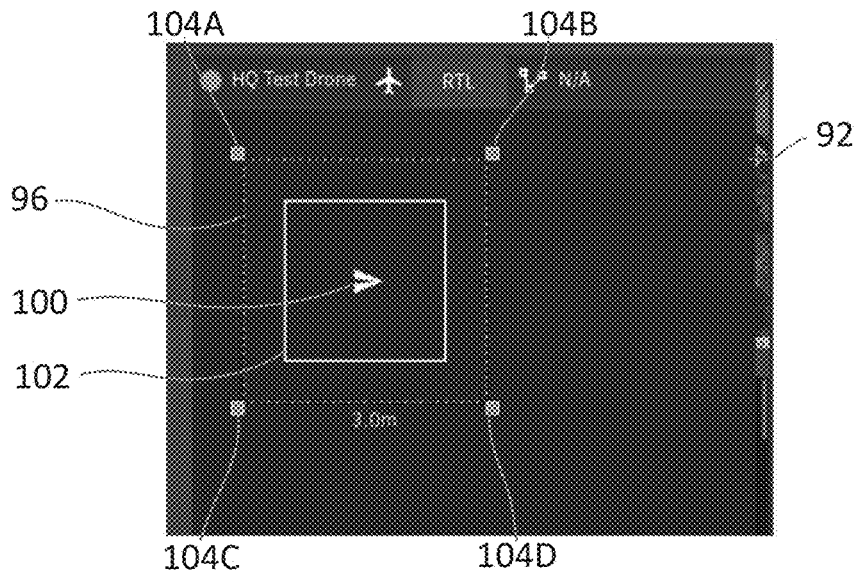

FIGS. 7A to 7C illustrate one example of the precision landing indicator 96 which may optionally remain hidden during normal flight operations but which appear on the graphical user interface 90 when the precision landing procedure is initiated during UAV 20 landing. The targeted landing zone 16 on the base station 12 may be represented by an image such as a square or rectangular landing zone indicator 102 while a relative position of the UAV 20 may be represented by a UAV indicator 100, as shown in FIG. 7A. An outer border may be illustrated having nodes 104A-104D in each corner of the outer border where each node 104A-104D corresponds to a respective anchor 18A-18D located in each corner of the landing zone 16. For each anchor 18A-18D which is in communication with the tag 22 on the UAV 20, each respective node 104A-104D may be provided with a visual indicator. For example, an anchor in communication with the tag 22 on the UAV 20 may be shown in a color such as green while an anchor which is in fault or not in communication with the tag 22 may be shown in a color such as red on the precision landing indicator 96. When the UAV 20 and tag 22 are too far from the landing zone 16 and anchors 18A-18D to communication, the nodes 104A-104D may be shown as empty or uncolored.

As illustrated in FIGS. 7B and 7C, the landing zone indicator 102 may be illustrated as a square which may move relative to the UAV indicator 100 to provide the relative positioning of the UAV 20 as it approaches the landing zone 16. As the UAV 20 descends via the precision landing procedure, the landing zone indicator 102 may increase in size relative to the outer border and UAV indicator 100, as shown between the FIGS. 7B and 7C, and a scale may also be provided to show the altitude of the UAV 20 relative to the landing zone 16. Once the UAV 20 has successfully landed upon the landing zone 16, the landing zone indicator 102 may be shown increased in size with the UAV indicator 100 centered within the landing zone indicator 102.

Figure 8:
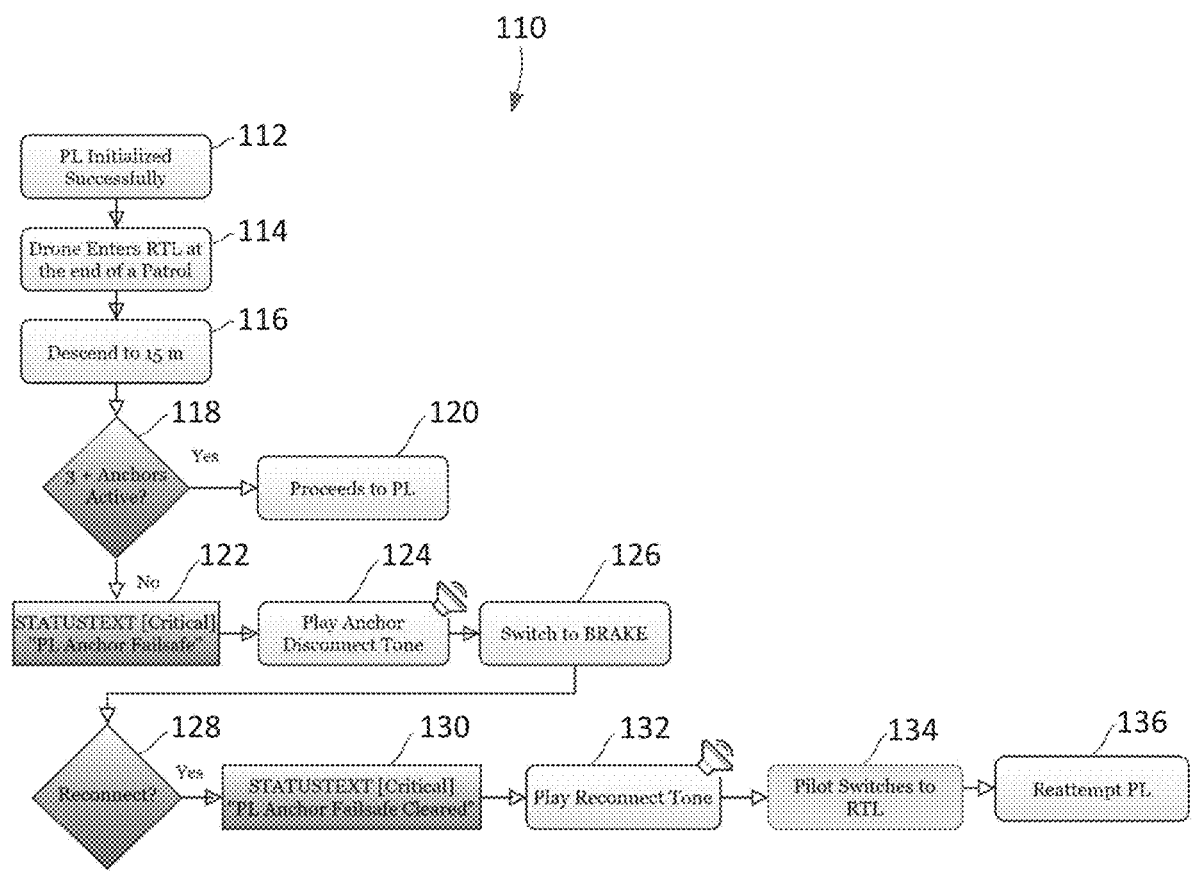
FIG. 8 illustrates a flow diagram showing one variation of such a failsafe procedure.

In the event that some fault occurs and the precision landing procedure is unable to be activated, the flight controller in the UAV 20 or companion computer in the tag 22 may automatically activate a failsafe procedure. One variation of such a failsafe procedure is shown in the flow diagram 110 of FIG. 8. Once the precision landing procedure has initialized successfully 112, as described herein, the UAV 20 may enter its RTL mode such as at the end of a patrol or mission 114. As the UAV 20 approaches the base station 12, the tag 22 and companion computer may attempt to communicate with the anchors 18A-18D and if three or more of the anchors are active and engaged in communication 118 with the tag 22, the UAV 20 may proceed with the precision landing procedure 120 and land upon the landing zone 16, as described.

However, if fewer than three of the anchors 18A-18D are in communication with the tag 22, then an indicator may be alerted on the display to the pilot or user 122 such as a message (e.g., "PL Anchor Failsafe") or other textual or visual indicator or alarm. An auditory indicator or alert may also be played 124 to the pilot or user and looped until the auditory indicator or alert is disarmed by the pilot or user or until the tag 22 reconnects with the appropriate number of anchors 18A-18D. With the text and auditory indicators active, the flight controller or companion computer in the UAV 20 may automatically switch the UAV 20 into a temporary holding or "Brake" mode 126 during which the tag 22 may attempt or wait to connect to the anchors 18A-18D. If reconnection is successful 128 with at least three of the anchors 18A-18D, another message may alert the pilot or user indicating that failsafe has been cleared (e.g., "PL Anchor Failsafe Cleared") 130 and an auditory indicator or alert may also be played 132 to indicate that reconnection has been successful. The pilot or user may manually switch the UAV 20 into its RTL mode 134 or they may allow the companion computer and UAV 20 continue into its precision landing procedure 136.

Aside from the failsafe procedure described above, the UAV 20 and companion computer may implement alternative failsafe procedures instead. Another failsafe procedure may utilize a precision landing position estimate in which the UAV 20 may be automatically switched to its Brake mode so that the UAV 20 maintains a hovering position when the horizontal position of the UAV 20 is estimated to differ by more than some preset distance (e.g., 8 m or more) from its actual horizontal position. The estimated difference in horizontal position may be due to any number of errors such as a faulty GPS reading, bad state estimate, etc.

Figure 9:
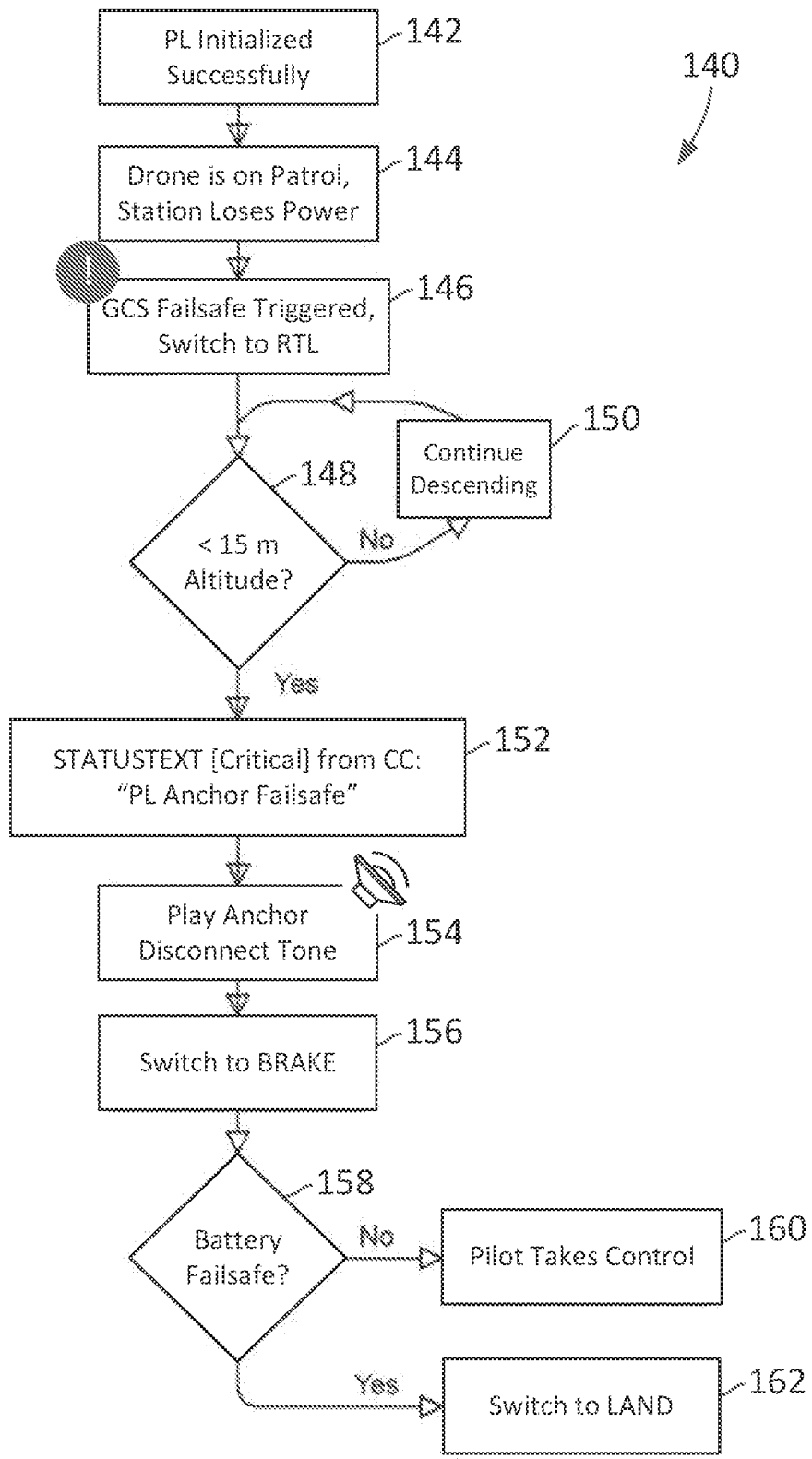
FIG. 9 illustrates a flow diagram showing another variation of a failsafe procedure when the base station loses power prior to the UAV attempting to land upon the base station.

Another failsafe procedure may include a precision landing failsafe in the event that the base station 12 loses power prior to the UAV 20 attempting to land upon the base station 12. One variation is illustrated in the flow diagram 140 of FIG. 9 where a UAV 20 may have its precision landing procedure initialized successfully 142, e.g., prior to or during take-off from the base station 12. If the base station 12 loses power while the UAV 20 is in flight 144, a failsafe may be automatically triggered causing the UAV 20 to enter a RTL mode in which case the UAV 20 may be commanded to begin a descent. The UAV 20 may continue to descend 150 until the UAV 20 is at an altitude 148 of less than, e.g., 15 m. The companion computer on the UAV 20 may transmit a message or alert (e.g., "PL Anchor Failsafe") to the pilot or user 152 and an audible indicator or alert may also be played 154 to indicate the precision landing anchor failsafe the UAV 20 may be automatically switched to its Brake mode 156 so that the UAV 20 maintains a hovering position. If a determination is made that a battery or power has failed 158, the UAV 20 may be automatically switched to a landing mode 162 to land safely either upon the base station 12 or a clearing upon the ground but if the battery or power has not failed in the base station 12, the pilot or user may take control 160 of the UAV 20.

Any of the variations and features between different embodiments described herein are expressly intended to be used in any number of combinations. Hence, any of the UAV variations may implement any of the methods or procedures between different embodiments.

The applications of the disclosed invention discussed above are not limited to the embodiments described, but may include any number of other non-flight applications and uses. Modification of the above-described methods and devices for carrying out the invention, and variations of aspects of the invention that are obvious to those of skill in the arts are intended to be within the scope of this disclosure. Moreover, various combinations of aspects between examples are also contemplated and are considered to be within the scope of this disclosure as well.

What is claimed is:

1. A precision landing system for an unmanned aerial vehicle (UAV), comprising:
   one or more anchors configured for placement in proximity to a landing zone;
   a tag configured for securement to the UAV, wherein the tag is further configured to wirelessly communicate with at least three or more of the anchors when the UAV is in proximity to the landing zone;
   a controller in communication with the tag, wherein the controller is configured to fly the UAV towards a centerline axis which represents a center of the landing zone and defined through a first airspace zone defined at a first altitude above the landing zone, wherein the controller is further configured to maintain the UAV within the first airspace zone until the UAV has descended to the first altitude,
   wherein the controller is further configured to fly the UAV towards the centerline axis defined through a second airspace zone defined at a second altitude which is below the first altitude, wherein the controller is further configured to maintain the UAV within the second airspace zone until the UAV has descended to the second altitude, and
   wherein the controller is further configured to fly the UAV towards the centerline axis defined through a third airspace zone defined at a third altitude which is below the second altitude, wherein the controller is further configured to maintain the UAV within the third airspace zone until the UAV has descended to the landing zone.

2. The system of claim 1 wherein the one or more anchors comprise ultra wideband transmitter/receiver units.

3. The system of claim 1 wherein the one or more anchors comprise four anchors each positioned at a corner of the landing zone.

4. The system of claim 1 wherein the controller comprises a computer having a processor for communicating via the tag with the at least three or more anchors.

5. The system of claim 1 wherein the controller is configured to maintain the UAV between an altitude of 25-50 m within the first airspace zone.

6. The system of claim 1 wherein the controller is configured to maintain the UAV between an altitude of 15-25 m within the second airspace zone.

7. The system of claim 1 wherein the controller is configured to maintain the UAV between an altitude of 0-15 m within the third airspace zone.

8. The system of claim 1 wherein the controller is configured to automatically reduce a gain value prior to landing the UAV upon the landing zone.

9. The system of claim 1 wherein the tag is configured to initialize with the at least three or more anchors prior to take off from the landing zone.

10. A method for precision landing of an unmanned aerial vehicle (UAV), comprising:

initializing wireless communication between a tag secured to a UAV in flight and with one or more anchors positioned in proximity to a landing zone;

communicating between the tag and with at least three or more of the anchors;

actuating the UAV to fly towards a centerline axis which represents a center of the landing zone and defined through a first airspace zone defined at a first altitude above the landing zone while maintaining the UAV within the first airspace zone until the UAV has descended to the first altitude;

further actuating the UAV to fly towards the centerline axis defined through a second airspace zone defined at a second altitude which is below the first altitude while maintaining the UAV within the second airspace zone until the UAV has descended to the second altitude; and further actuating the UAV to fly towards the centerline axis defined through a third airspace zone defined at a third altitude which is below the second altitude while maintaining the UAV within the third airspace zone until the UAV has descended to the landing zone.

11. The method of claim 10 wherein initializing wireless communication comprises communicating via ultra wideband.

12. The method of claim 10 wherein communicating between the tag comprises transmitting a signal from the tag and receiving a response from the at least three or more anchors.

13. The method of claim 10 wherein communicating between the tag comprises transmitting a signal from the tag to four anchors each positioned at a corner of the landing zone.

14. The method of claim 10 wherein communicating between the tag comprises communicating via a controller having a processor for communicating via the tag with the at least three or more anchors.

15. The method of claim 10 wherein actuating the UAV comprises maintaining the UAV between an altitude of 25-50 m within the first airspace zone.

16. The method of claim 10 wherein further actuating the UAV to fly towards the centerline axis defined through the second airspace zone comprises maintaining the UAV between an altitude of 15-25 m within the second airspace zone.

17. The method of claim 10 wherein further actuating the UAV to fly towards the centerline axis defined through the third airspace zone comprises maintaining the UAV between an altitude of 0-15 m within the third airspace zone.

18. The method of claim 10 further comprising automatically reducing a gain value prior to landing the UAV upon the landing zone.

19. The method of claim 10 further comprising initializing with the at least three or more anchors prior to take off from the landing zone.

20. The method of claim 10 further comprising performing a failsafe procedure if the tag loses communication with three or more of the anchors.

* * * * *